June 12, 1973  E. N. CURCIO  3,738,892
INDUCTION HEATING APPARATUS FOR SEALING TUBE-LIKE CONTAINERS
Filed May 14, 1971  2 Sheets-Sheet 2

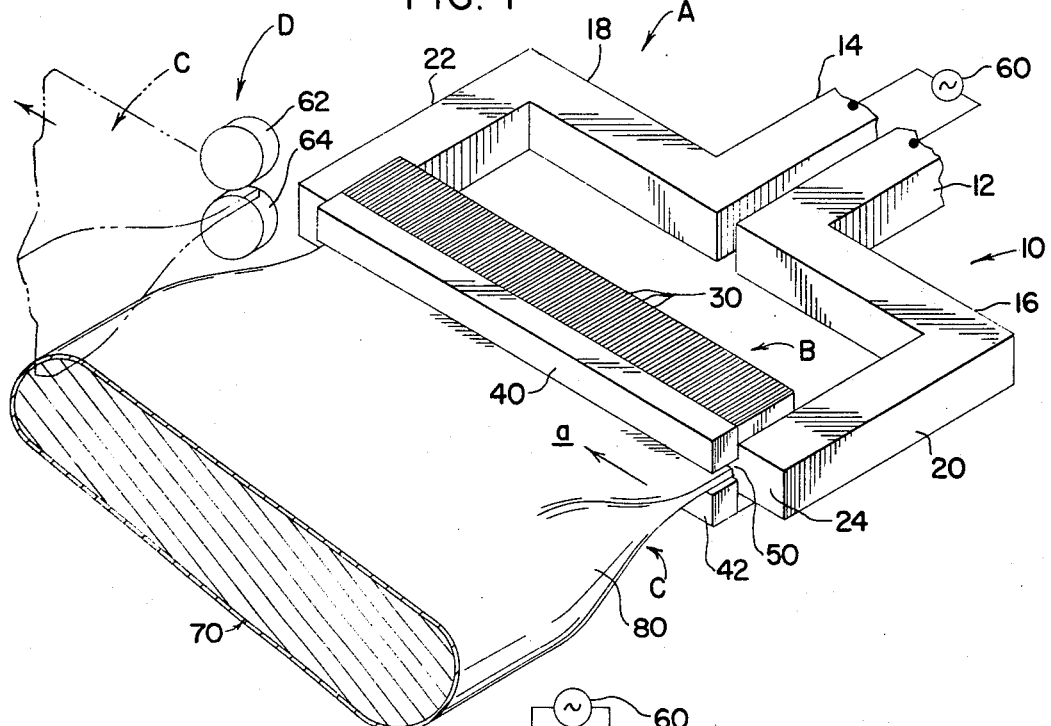
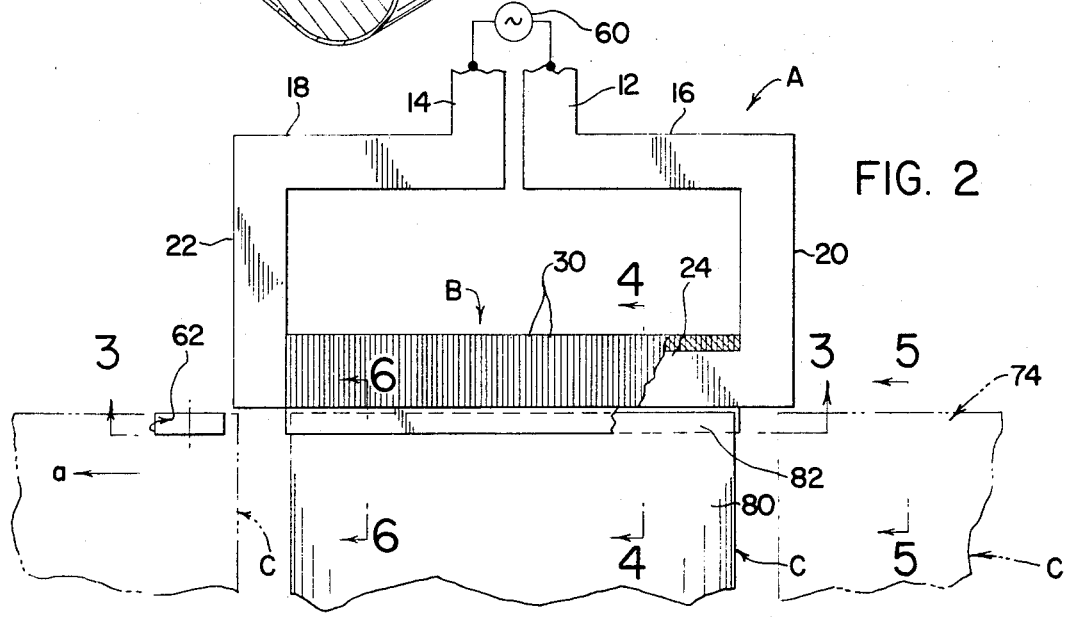

INVENTOR.
EDMUND N. CURCIO
BY
Meyer, Tilberry & Body
ATTORNEYS

United States Patent Office 3,738,892
Patented June 12, 1973

3,738,892
INDUCTION HEATING APPARATUS FOR SEALING
TUBE-LIKE CONTAINERS
Edmund N. Curcio, South Orange, N.J., assignor to
Park-Ohio Industries, Inc., Cleveland, Ohio
Filed May 14, 1971, Ser. No. 143,466
Int. Cl. B29c 19/02; H05b 5/00
U.S. Cl. 156—380      8 Claims

ABSTRACT OF THE DISCLOSURE

A method and apparatus for sealing by induction the ends of tube-like containers comprised of electrically non-conductive material wherein a thin layer of an electrically conductive material is disposed at least along one side of the area to be sealed which area is then inductively heated to effect adhesion between the contacting surfaces. The area so joined is then pressed together at least after being heated.

---

This application pertains to the art of induction heating and more particularly to the use of induction heating for joining electrically non-conductive materials.

The invention is particularly applicable to sealing the ends of plastic tube-like containers and will be described with particular reference thereto; however, it will be appreciated that the invention has broader applications and may be utilized in other instances where it is desirous of joining electrically non-conductive materials together by using induction heating.

Prior to this invention, seam areas for the ends of plastic tube-like containers were formed by conduction or resistance heating. That is, the seam areas have, for example, previously been fused together by placing the ends of the tube-like containers between a pair of oppositely disposed heated platens such that the platens physically contacted the areas to be joined. In this position, the containers were passed transversely between the heated platens such that the heat therein was conducted through the containers in order to effect adhesion between the mating plastic surfaces. The difficulty encountered with this type of sealing apparatus has been that it was necessary to have the platens in actual physical contact with the containers. This type of operation facilitated great difficulty in passing the containers, and particularly areas to be joined between the platens in that since there was physical contact between them, quite often interference or snagging could result between the relative moving surfaces so as to ruin the seam area.

A further difficulty encountered was that the prior joining processes used were extremely slow and therefore required extensive production time. Increasing the temperature of the above described platens in an attempt to decrease the required heating time merely increased the probabiliies that interference or snagging would be incurred. The increased temperatures would also cause the material at the seam areas to become excessively soft and form unsatisfactory seams.

The present invention contemplates a new and improved method and apparatus which overcomes the above referred problems and others and provides a new method and apparatus for sealing the ends of tube-like containers comprised of electrically non-conductive materials by induction heating which is fast, simple, economical and provides a high quality seam.

In accordance with the present invention, there is provided a method for sealing an end of a tube-like container comprised of an electrically non-conductive material by induction heating wherein the method comprises the steps of:

(a) Forcing the inner peripheral surface of the container adjacent one end thereof into a surface-to-surface contacting relationship with itself in order to form an area to be joined;

(b) Placing at least one thin layer of an electrically conductive material on the outside of the container on at least one side of the area to be joined and coextensive therewith;

(c) Inductively heating the layer whereby the contacting inner peripheral surface areas are heated by conduction and adhesion of the surfaces is effected; and, (d) Pressing the area to be bonded at least after adhesion.

In accordance with another aspect of the present invention, there is provided an apparatus for sealing the end of a tube-like container comprised of an electrically non-conductive material. A plurality of thin conductor elements are spaced in an at least partially insulated side by side relationship to define an elongated container channel pass. High frequency electrical energy is supplied to the conductors and the magnetic flux generated thereby is focused transversely across the pass. Means for pressing the area to be sealed is disposed generally immediately adjacent the exit end of the channel pass. The container end is merely passed transversely along and between the channel pass and through the pressing means to effect bonding.

The principal object of the present invention is the provision of a new and improved method and apparatus for sealing the end of a tube-like container comprised of electrically non-conductive material.

Another object of the present invention is the provision of a new and improved method and apparatus for sealing the end of a tube-like container comprised of electrically non-conductive material which is fast and economical and provides a high quality seal.

Another object of the present invention is the provision of a new and improved method and apparatus for sealing the end of a tube-like container comprised of electrically non-conductive material which reduces scrap generated during use.

The invention may take physical form in certain parts and arrangements of parts, a preferred embodiment of which will be described in detail in this specification and illustrated in the accompanying drawings which form a part hereof and wherein:

FIG. 1 is a perspective view of an apparatus employing the concepts of the subject invention;

FIG. 2 is a plan view of the apparatus shown in FIG. 1;

FIG. 3 is a front view of the apparatus shown in FIG. 2 along lines 3—3 with the workpiece removed for ease of illustration;

Figure 4:
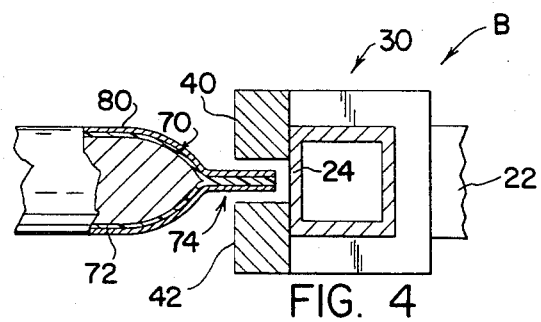
FIG. 4 is a cross sectional view along lines 4—4 in FIG. 2.

Referring now to the drawings wherein the showings are for the purposes of illustrating a preferred embodiment of the invention only and not for purposes of limiting same, the figures show an inductor A which includes a focusing portion B, container C and rollers D.

More specifically, inductor A includes a body portion generally designated 10 having lead portions 12, 14 and legs 16, 18, 20, 22 and 24. Body portion 10 is constructed from hollow square copper tubing.

Figure 7:
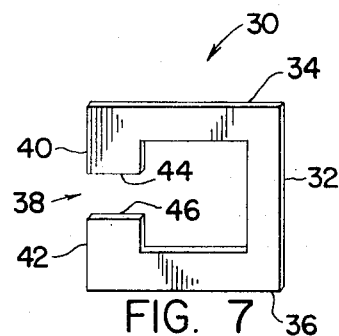
FIG. 7 is one type of conductor element which may be used.
Figure 8:
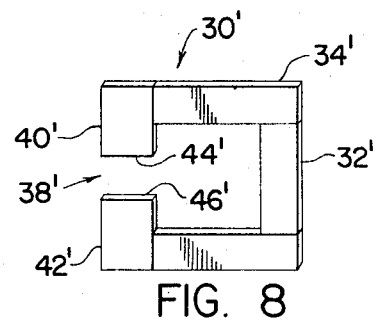
FIG. 8 is another type of conductor element which may be utilized.

Spaced along leg 24 in a side by side relationship are a plurality of conductors 30. Two conductor designs are specifically shown in FIGS. 7 and 8. With reference to FIG. 7, the conductor therein shown has been stamped from an iron-based metal and includes closed end portion 32, legs 34, 36 and an open end portion 38. Open end portion 38 includes focusing portions 40, 42 having oppositely disposed spaced apart parallel surfaces 44, 46. Similarly, FIG. 8 shows a fabricated conductor wherein closed end portion 32', leg 34', leg 36', focusing portion 40' and focusing portion 42' are all separate and distinct portions interconnected with each other. Again, these individual portions may be stamped from an iron-based material and joined together by any convenient means.

As an alternative to manufacturing the conductor or conductor portions from an iron-based material, a ferrite material could be utilized either for making the entire conductors themselves, the focusing portions only, or the legs in combination with the end portion. The reason for using thin laminated conductors stamped from an iron-based material or in the alternative, a ferrite material will be further discussed hereinbelow relative to operation of the apparatus.

Referring specifically to FIGS. 1, 2, and 4, it will be seen that the plurality of conductors 30 are closely received about the outside periphery of leg 24 of body portion 10. With this construction, there is provided an elongated workpiece pass 50 best shown in FIGS. 1, 3, 5 and 6. The pass is defined between the plurality of surfaces 44, 46 when using the conductor configuration shown in FIG. 7. A source of high frequency electrical energy generally designated 60 is disposed across leads 12, 14 and may be of any of the types generally known in the induction heating art. Further, a source of cooling fluid such as water (not shown) is connected to leads 12, 14 to supply a circulating coolant supply through body portion 10. As high frequency electrical energy is introduced into the leads it is transferred to conductors 30 where it is most advantageous to have the current flow circumferentially around leg 24 though the individual conductors so that the flux generated thereby is directed transversely across the pass area. To accomplish this current flow, and assuming the conductors 30 are of the type illustrated in FIG. 7, it is merely only necessary to permit each conductor to have formed thereon a certain amount of iron oxide prior to assemblage onto leg 24. As current naturally flows along the path of least resistance, and as the iron oxide formed on the sides thereof does offer resistance, the current will flow circumferentially through each conductor around leg 24 so that the flux generated is focused transversely across the pass area. In the alternative, other coatings could be applied to the sides of each conductor; however, this would add unnecessary cost to the construction of the inductor. As an alternative, a ferrite material having particular matter dispersed therein as is known in the art may be used for either the conductors or focusing portions so that the current will again flow circumferentially around the leg and transversely across the pass.

A pair of oppositely disposed pressure rolls 62, 64 are mounted adjacent to exit area of pass 50 to supply opposed forces to the seam area following heating. These rolls may be mounted by convenient means for movement relative each other to permit a seam area to pass therebetween. Spring biased rolls, for example could be used.

Figure 5:
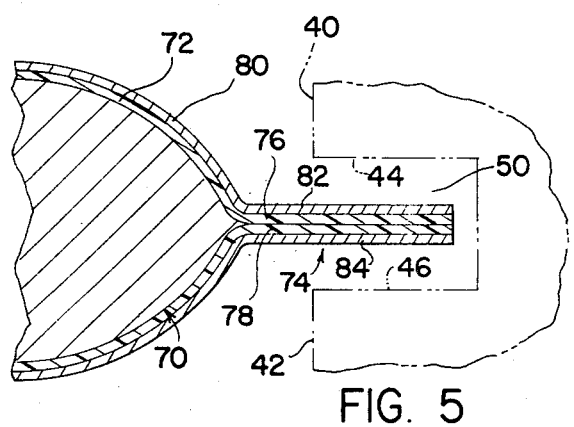
FIG. 5 is a cross sectional view taken along lines 5—5 in FIG. 2.
Figure 6:
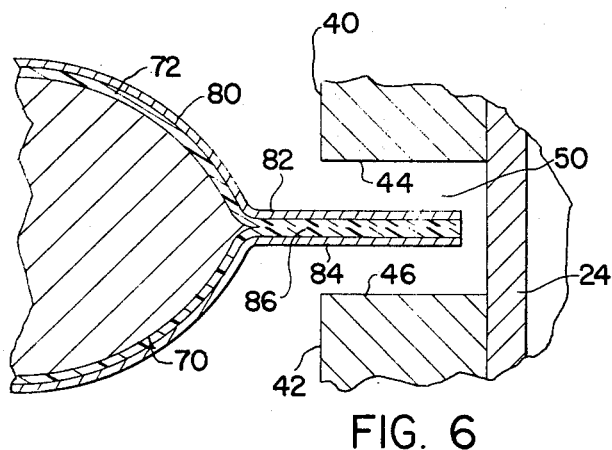
FIG. 6 is a cross sectional view taken along lines 6—6 in FIG. 2.

To illustrate operation of the subject invention, a container C formed from an elongated tube-like member generally designated 70 will be used wherein it is desired to permanently seal one end of the container. In the figures, the tube-like member may be formed from any electrically non-conductive material 72, a thermoplastic material being used in the preferred embodiment. The thickness of material 72 may be varied as dictated by specific job requirements for the container itself. Prior to actual sealing, one end of the tube is pressed together such that opposed portions of the inner peripheral surface of tube-like member 70 contact each other to form an elongated seam area 74 extending transverse to the tube-like member. This seam area is comprised of contacting surfaces designated 76, 78. As best shown in FIGS. 4, 5 and 6, a thin iron based foil 80 is placed over material 72 to at least cover seam area 74. This foil, however, may extend over a larger portion of the container as is shown in the figures. Also, in the preferred embodiment, the thin foil is laminated to material 72 prior to formation of seam area 74. The foil includes portions 82, 84 respectively mating with surfaces 76, 78.

Once foil 80 is positioned and seam area 74 is formed, the container is directed transversely through pass 50 in direction $a$ shown in FIGS. 1, 2 and 3 to effect adhesion of contacting surfaces 76, 78. As the container, and particularly seam area 74, travels through the pass equidistantly spaced from surfaces 44, 46, heat generated by the induction heating of thin foil 80, i.e., portions 82, 84, is conductively passed to surfaces 76, 78 in order that they will form a joint 86 as best shown in FIG. 6. To assure that fusing is complete, seam area 74 is then passed between pressure rollers 62, 64 following heating as shown in phantom in FIGS. 1 and 2. These act to apply oppositely disposed forces against the seam area to further force surfaces 76, 78 together. As an alternative to using rollers 62, 64, focusing portions 40, 42 could be mounted to permit relative transverse movement thereof with the normal position being where surfaces 44, 46 are closely spaced relative to each other until seam area 74 passes therebetween to separate them. In effect, portions 40, 42 act as pressure pads to force overlapping portions 76, 78 together.

Further, it may be desired to have a second lamination of thermoplastic material for added container strength such that the iron-based foil 80 is disposed between two layers of thermoplastic material. In this process the plastic materials and foil are laminated together prior to formation of seam area 74. This, however, is merely a variation of the use of the subject invention.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus defined my invention, I now claim:

1. An induction heating apparatus particularly useful for sealing the end of a tube-like container comprised of an electrically non-conductive material, said apparatus comprising:
   a plurality of thin conductor members disposed in a side by side relationship to define an elongated container channel pass having an entrance area and exit area, each of said plurality of conductors comprising a substantially U-shaped element;
   means for at least partially insulating adjacent conductor members from one another;
   means for supplying electrical energy to said conductor members to effect current flow in said conductors;
   means for focusing the flux generated by said current flow transversely across said pass, said focusing means including first and second focusing portions, said first focusing portion disposed adjacent the end of one leg of each said conductor and said second focusing portion disposed adjacent the end of the other leg of each of said conductor; and,
   means for pressing said workpieces together at the area to be sealed.

2. The apparatus as defined in claim 1 wherein said conductors are constructed from an iron-based material and said focusing means are constructed from a ferrite material.

3. The apparatus as defined in claim 1 wherein said focusing means are integral with each said conductor.

4. The apparatus as defined in claim 3 wherein said conductors and focusing means are constructed from an iron-based metal and said insulating means comprises iron oxide formed of the side faces of said conductors.

5. The apparatus as defined in claim 3 wherein said conductors and focusing means are constructed from a ferrite material.

6. An induction heating apparatus particularly useful for sealing the end of a tube-like container comprised of an electrically non-conductive material, said apparatus comprising:
   a plurality of thin conductor members disposed in a side by side relationship to define an elongated container channel pass having an entrance area and an exit area;
   means for at least partially insulating adjacent conductor members from one another;
   means for supplying electrical energy to said conductor members to effect current flow in said conductors;
   means for focusing the flux generated by said current flow transversely across said pass;
   means for pressing said workpieces together at the area to be sealed; and,
   a means for cooling said conductors;
   said means for supplying said electrical energy is a hollow bar element, said conductors being received therearound and in contact therewith in said side by side relationship.

7. The apparatus as defined in claim 6 wherein said cooling means comprises means for permitting cooling fluid through said hollow bar element.

8. An induction heating apparatus particularly useful for sealing the end of a tube-like container comprised of an electrically non-conductive material, said apparatus comprising:
   a plurality of thin conductor members disposed in a side by side relationship to define an elongated container channel pass having an entrance area and an exit area;
   means for at least partially insulating adjacent conductor members from one another;
   means for supplying electrical energy to said conductor members to effect current flow in said conductors;
   means for focusing the flux generated by said current flow transversely across said pass;
   means for pressing said workpieces together at the area to be sealed; and,
   said pressing means including opposed pressure rollers disposed on opposite sides of said channel pass adjacent said exit area for a pressure rolling contact relationship with said workpieces.

References Cited
UNITED STATES PATENTS

| | | | |
|---|---|---|---|
| 3,507,735 | 4/1970 | Chisholm | 156—380 |
| 3,462,336 | 8/1969 | Leatherman | 156—272 |
| 3,652,361 | 3/1972 | Leatherman | 156—272 |

DOUGLAS J. DRUMMOND, Primary Examiner

U.S. Cl. X.R.

219—10.49, 10.53, 10.75